Patented Oct. 3, 1944

2,359,281

UNITED STATES PATENT OFFICE 2,359,281

METHOD OF PRODUCING COAGULUM FOR PURIFYING WATER

Orrin E. Andrus, Altadena, Calif.

No Drawing. Application March 11, 1940,
Serial No. 323,407

5 Claims. (Cl. 210—14)

This invention relates to a method of producing coagulum for purifying water in filtering operations.

The invention has been embodied in the production of an aluminum coagulum and it is based upon the discovery that when water is boiled in a metallic aluminum container or in contact with metallic aluminum or certain insoluble or slightly soluble aluminum compounds, gases are evolved from the water and a quantity of aluminum becomes dissolved in the water in addition to that which may form or be present as a suspended compound. The quantity of aluminum dissolved in this manner is sufficient in most cases to adequately clarify and purify the water if the aluminum is converted into a coagulum.

Unless this dissolved aluminum is removed from the water several difficulties are apt to be encountered. In order to obtain sufficient coagulum to accomplish satisfactory purification and filtration, it may be necessary to convert this dissolved aluminum into a coagulum. Frequently suspensions are difficult or impossible to remove by filtration until the dissolved aluminum is converted into a coagulum. Although this dissolved aluminum would not be injurious to health in the concentration present, it is desirable from the psychological standpoint to essentially eliminate contamination of the filtered water with aluminum. A further objection to filtered water bearing soluble aluminum is its tendency to produce cloudy suspensions upon exposure to the air.

The principal object of the invention is to produce a purifying coagulum from aluminum which has gone into solution as a result of heating water to a sterilizing temperature in contact with metallic aluminum or its water insoluble compounds.

Another object is to remove soluble aluminum from the water.

When certain gases are expelled from water during heating to a sterilizing temperature either with or without electrolysis, as by boiling in contact with metallic aluminum, certain aluminum alloys or with certain essentially water insoluble aluminum compounds as aluminum hydroxide, it is found that soluble aluminum compounds are formed in the water. Frequently the formation of soluble aluminum compounds is accompanied by the formation of some insoluble aluminum compounds. The explanation for this formation of soluble aluminum compounds is thought to be the expulsion of carbon dioxide or other volatile acid radicals from the water along with the reaction of the metal radical with metallic aluminum or aluminum compound to form a soluble aluminate. If the above reaction takes place in an open container, the gases are lost and the soluble aluminum compound, probably an aluminate, remains in solution in the water during filtration.

In accordance with the invention the soluble aluminum is reacted upon by the previously expelled gases or by an equivalent acid radical preceeding filtration to thereby transform this soluble aluminum into a purifying aluminum coagulum. Subsequent filtration traps this coagulum and removes it from the water along with other impurities.

The process is preferably carried out in a pressure or closed container which retains the gases liberated by the boiling action and by the chemical reactions, so that they will re-dissolve in the water when the latter is sufficiently cool and effect the desired precipitation of an aluminum coagulum within the container prior to filtering. The water may then be filtered to remove the aluminum compounds and impurities.

The process constitutes an improvement when applied to the process described in United States Letters Patent No. 2,087,136 issued to the present inventor on July 13, 1937, and also when used in connection with the apparatus and process described in United States Letters Patent No. 2,194,781 issued to the present inventor on March 26, 1940, and the application for which was copending herewith. The present application is a continuation in part of the application which issued in the latter patent referred to.

When employing sterilization by heat it is preferable to raise the water to a temperature of about 250° F. to insure the destruction of all bacteria. However, a temperature of 212° F. is sufficient to kill water born pathogenic bacteria. If the process described in United States Patent No. 2,087,136 is practiced and an aluminum coagulum is formed, as by chemical reaction of a soluble aluminum salt and a soluble reacting salt, and the sterilization heat evolves gases during or following this period of precipitation, then at least some of the precipitated aluminum compound will be dissolved. If then the previously expelled gases or an equivalent acid radical is dissolved in the water, a purifying coagulum will be formed. Filtration will then remove the coagulum and attached impurities.

Heretofore, in order to provide sufficient coagulum for purification of a water, it was often necessary to add an excess of aluminum salt since part of this frequently remained in soluble form following the heating operation and was not precipitated as a purifying coagulum. The presence of this soluble aluminum compound also gave rise to initially turbid filtrates and also to filtrates which became turbid on standing in open containers. With the present invention only enough chemicals need be added to directly provide the required coagulum.

The introduction of the aluminum by merely heating the water to sterilizing temperatures in a metallic aluminum container has not been appreciated heretofore as a means of introducing a purifying aluminum coagulum since the aluminum was in dissolved form and was not precipitated. The present invention provides a very simple method of precipitating an aluminum coagulum.

The invention is also applicable to processes wherein the water is boiled in non-aluminum containers, as vitreous enamel ware, bronze, etc., and metallic aluminum, aluminum alloy or soluble or insoluble aluminum compounds are present during the heating operation.

The process is applicable to methods in which the aluminum is introduced by electrolytic action with heat sterilization of the water either before, during or after the electrolysis. In such case the electrolytic action results in the removal of aluminum from one or both electrodes, with the formation of aluminum compounds both soluble and insoluble. The amount of the soluble salts formed appears to be related to the quantity of certain salts present in the water. Gases are released during the combination of electrolysis and heating which, if caught in a sealed container and re-dissolved in the water, result in the transformation of the soluble aluminum into purifying coagulum. Where electrolysis has been employed heretofore to introduce an aluminum coagulum, difficulty has been encountered in utilizing heat sterilization due to the soluble aluminum remaining in the water during filtration. With the present invention of re-dissolving released gases this difficulty has been overcome. Furthermore with the new process it is unnecessary to continue the electrolytic action as long as previously since more coagulum is available with the same energy consumption.

It is possible that the soluble aluminum can be precipitated as aluminum coagulum by other means than that of re-dissolving part or all of the actual gases evolved during heat sterilization. For instance an acid radical may be introduced by passing carbon dioxide gas into the water from a standard liquid carbon dioxide cylinder. Ordinary dry ice may be introduced in the water to provide the carbon dioxide and also effect some cooling.

The process may be carried out using the principle of the reflux still to trap the gases rather than using a sealed or pressure container. Or the gas may be collected and preserved by other means and then re-introduced into the water prior to filtration. This invention is applicable to continuous processes or batch processes of water purification in which heat sterilization is used in conjunction with metallic aluminum or aluminum compounds. When reference is made to metallic aluminum it is intended to include certain aluminum alloys as well as pure aluminum. When mention is made of aluminum compounds this refers to certain soluble or insoluble compounds. When introducing soluble aluminum compounds into a water to purify the same it is usual but not always necessary to add a reacting chemical to cause precipitation of the soluble aluminum compound.

It is possible that the principle of the process can be used in the production of other forms of coagulum than that of aluminum. By coagulum is means a coagulated mass of insoluble chemical having water purifying characteristics such as coagulated aluminum hydroxide.

The present process is capable of producing water which is pure for drinking purposes and which is satisfactory from the standpoint of permanent clarity, odor, color, taste, sterility, aluminum content and added salt content. This process also makes it possible to form a purifying coagulum directly within the water without necessarily adding soluble chemicals such as reacting aluminum and sodium salts.

Various modes of practicing the invention may be employed within the scope of the invention as set forth in the claims.

The invention is claimed as follows:

1. In the purification of drinking water and the like, the method of producing a coagulum of aluminum hydroxide prior to filtration, comprising sterilizing a batch of water by heat in the presence of a solid substance containing atoms of aluminum, some of which react with the water to form aluminum hydroxide coagulum and others of which react with impurities in the water to form a soluble aluminum compound, cooling the water, and subsequently decomposing said soluble aluminum compound and precipitating the aluminum atoms from water solution in the form of aluminum hydroxide to provide a clear filtrate, the water being filtered thereafter to remove the coagulum therefrom.

2. In the purification of drinking water and the like, the method of producing a coagulum of a metal prior to filtration, comprising sterilizing a batch of the water by heat in the presence of a solid substance containing atoms of said metal, some of which react with the water to form a metal hydroxide coagulum and others of which react with impurities in the water to form a soluble compound of the metal and liberating gases from the water, collecting gases liberated from the water during said heating, cooling the water, and redissolving at least a portion of the gases in said water to substantially decompose the soluble compounds of said metal and form additional coagulum in the water, the water being filtered thereafter to remove the coagulum therefrom.

3. In the purification of water, the method of producing a coagulum of aluminum hydroxide therein prior to filtration, comprising sterilizing the water by heat in the presence of aluminum atoms producing soluble aluminum compounds therein, collecting gases liberated from the water during said heating, and cooling the water in the presence of said gases to effect redissolving of a portion of the gases and conversion of the soluble compounds of aluminum into a coagulum, the water being filtered thereafter to remove the coagulum therefrom.

4. In the purification of water, the method of producing an aluminum coagulum prior to filtration, comprising boiling a batch of water in an aluminum container to sterilize the water and to effect the formation of soluble and insoluble aluminum compounds in the water, collecting the gas liberated from the water during boiling and subsequently re-dissolving a portion of the gas in said water upon cooling of the water to substantially precipitate the soluble aluminum compounds from the water in the form of a coagulum, and thereafter filtering the water.

5. In the purification of water, the method of producing a coagulum of aluminum hydroxide prior to filtration, comprising sterilizing the water by heat in the presence of a solid substance containing atoms of aluminum and forming soluble and insoluble aluminum compounds in the water, cooling the water, and introducing therein carbon dioxide gas to precipitate dissolved compounds of aluminum from the water, the water being filtered thereafter to remove the precipitate therefrom.

ORRIN E. ANDRUS.